United States Patent [19]

Dickens et al.

[11] 4,284,447
[45] Aug. 18, 1981

[54] METHOD OF MANUFACTURING A COMPOSITE PANEL

[76] Inventors: Luther I. Dickens, 310 3rd St., Radford, Va. 24141; William C. Nanny, 550 Battery St., San Francisco, Calif. 94111

[21] Appl. No.: 40,192

[22] Filed: May 18, 1979

Related U.S. Application Data

[62] Division of Ser. No. 659,758, Feb. 20, 1976, abandoned.

[51] Int. Cl.³ ............................................. B29D 27/00
[52] U.S. Cl. .................................... 156/78; 52/309.5; 52/309.7; 52/309.12; 52/309.14; 52/309.16; 52/309.17; 52/410; 52/454; 52/475; 156/299; 264/45.4; 264/46.4; 264/46.7; 264/48; 264/55; 264/274; 264/275; 264/293; 425/4 R
[58] Field of Search .............. 52/309.4, 309.14, 309.7, 52/309.12, 454, 475, 309.16, 309.17, 410; 264/46.4, 46.7, 53, 45.4, 48, 55, 274, 275, 293; 428/192; 425/4 R; 156/78

[56] References Cited

U.S. PATENT DOCUMENTS

| 3,042,967 | 7/1962 | Edberg | 264/53 |
| 3,073,066 | 1/1963 | Edwards et al. | 52/454 |
| 3,112,163 | 11/1963 | Alderfer | 264/46.4 |
| 3,484,331 | 12/1969 | Betz | 52/309.7 X |
| 3,556,918 | 1/1971 | Lemelson | 428/192 X |
| 3,833,454 | 9/1974 | Ambrose | 264/46.4 |
| 4,144,296 | 3/1979 | Dickens | 264/45.4 |
| 4,157,640 | 6/1979 | Joannes | 52/309.7 |

FOREIGN PATENT DOCUMENTS

| 1925494 | 12/1970 | Fed. Rep. of Germany | 52/309.7 |
| 2062839 | 7/1971 | Fed. Rep. of Germany | 264/45.4 |
| 2332778 | 1/1974 | Fed. Rep. of Germany | 52/309.7 |
| 1357781 | 6/1974 | United Kingdom | 264/45.4 |

*Primary Examiner*—Philip Anderson
*Attorney, Agent, or Firm*—Alvin E. Hendricson

[57] ABSTRACT

A method of forming a panel structure useful in building construction and the like includes the steps of heating a heat expandable plastic in a separable mold having a cavity with the configuration of the resultant panel to form a panel core and adhering thin reinforcing strips to the front and back surfaces of the core. Control over the dimensions and configuration of the panel is obtained by adhering the strips to the core in the mold while applying heat thereto whereby core shrinkage is minimized. The strips may be adhered to the core during initial heating of the plastic material to form the core or may be adhered to the core in the mold subsequent to core formation.

9 Claims, 22 Drawing Figures

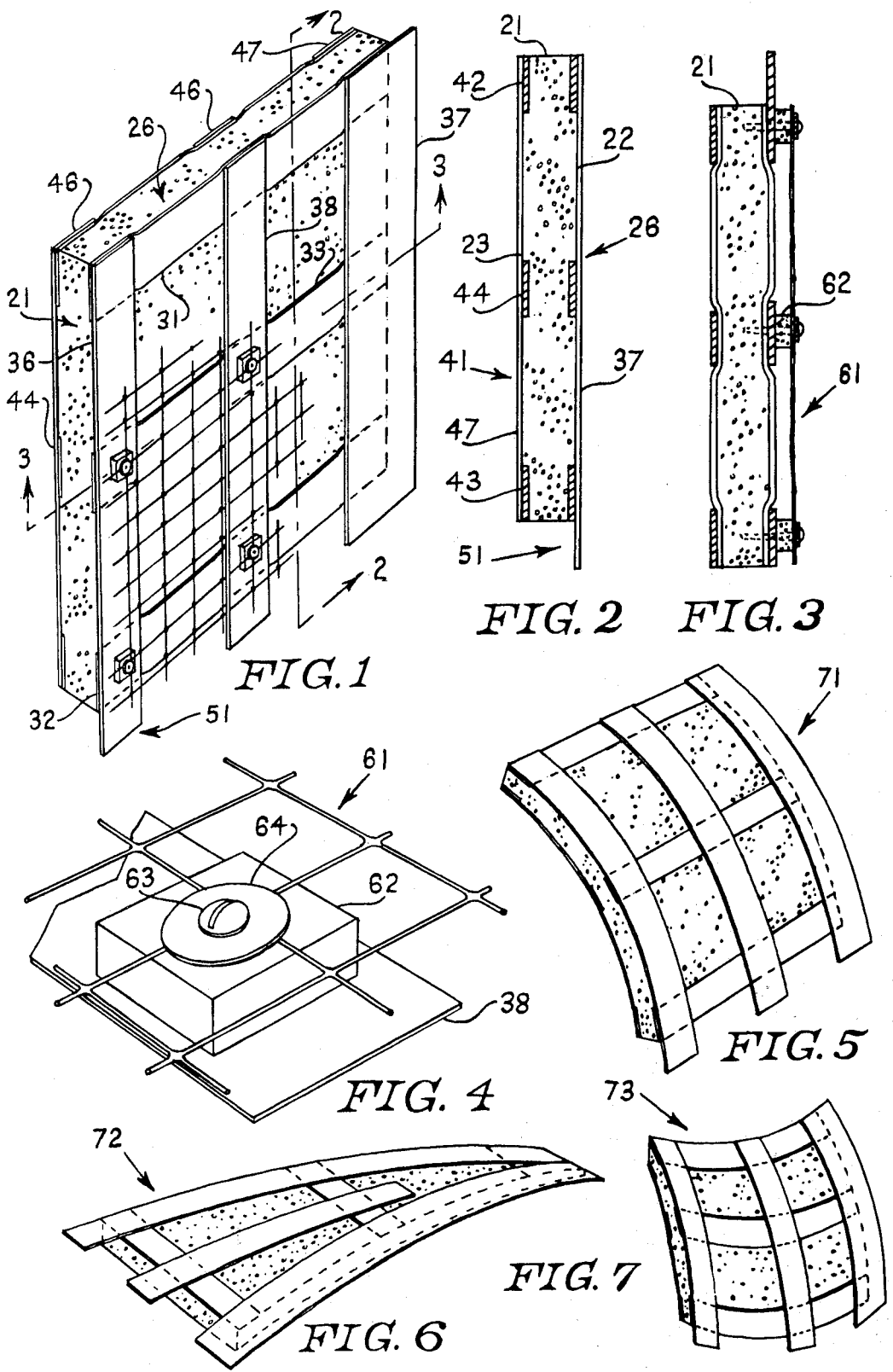

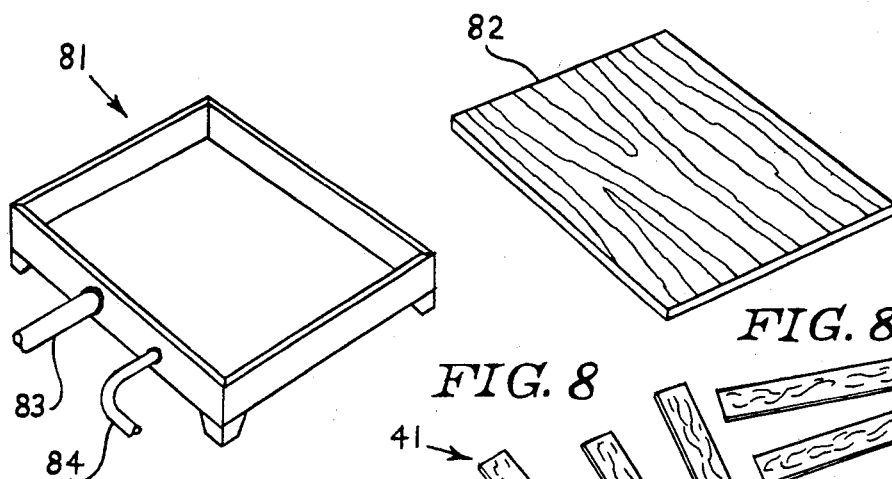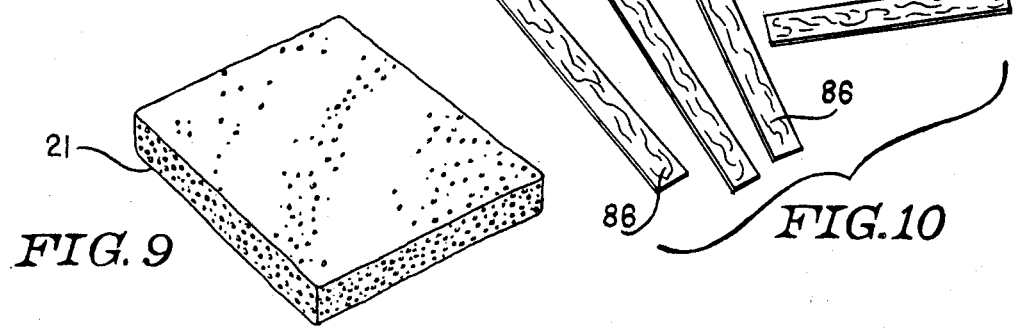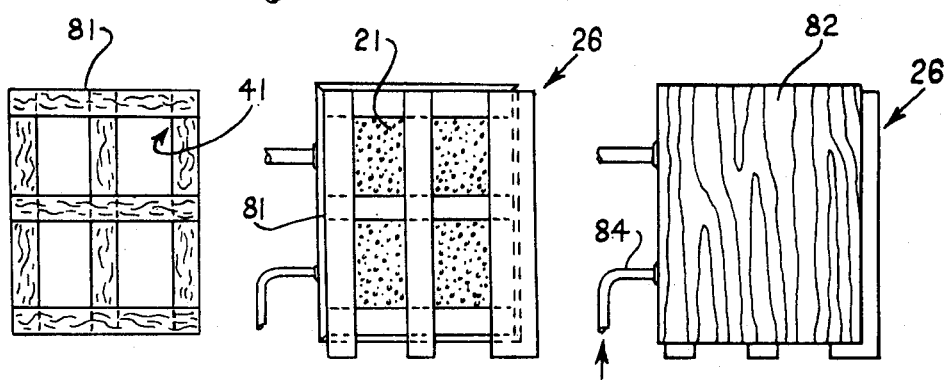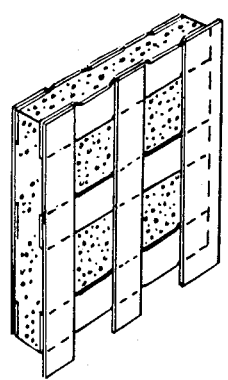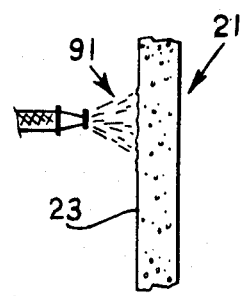

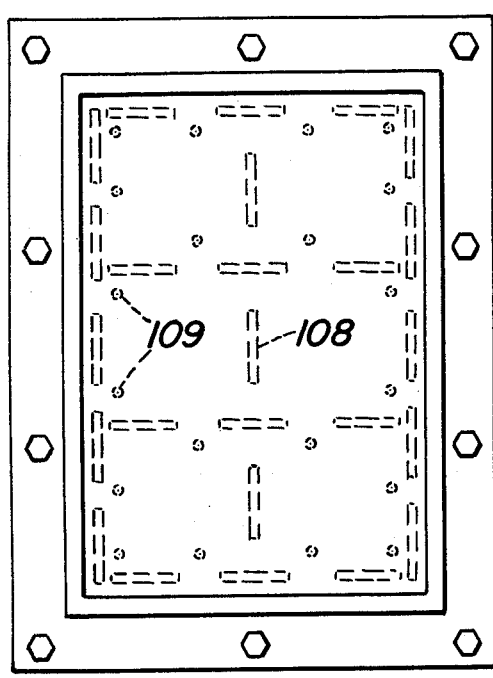
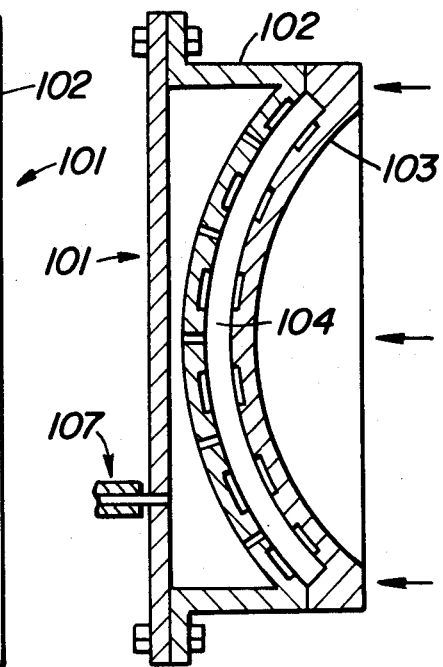
FIG. 16   FIG. 17
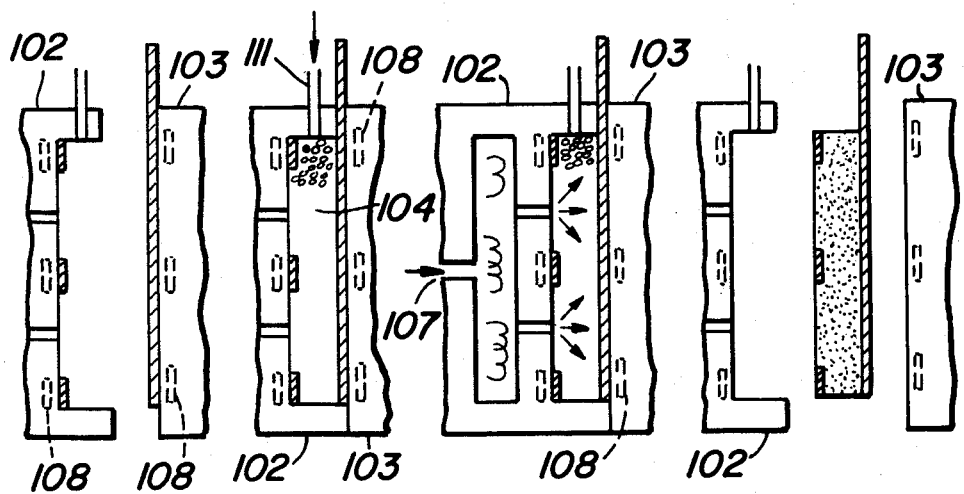
FIG. 18A   FIG. 18B   FIG. 18C   FIG. 18D

METHOD OF MANUFACTURING A COMPOSITE PANEL

This is a continuation-in-part of U.S. patent application Ser. No. 659,758 filed in the U.S. Patent and Trademark Office on Feb. 20, 1976, for Composite Panel Structure and Method of Manufacture and now abandoned. Application Ser. No. 910,762, filed May 30, 1980 and now U.S. Pat. No. 4,241,555 is a continuation of application Ser. No. 659,758 filed Feb. 20, 1976.

BACKGROUND OF INVENTION

There have been developed a wide variety of prefabricated panels or the like for multiple uses including building structures One eminently successful type of prefabricated panel is plywood. There have also been developed a variety of sandwich structures having, for example, a honeycomb core.

In the construction of buildings various types of preformed panels have been employed and in the field of concrete buildings, it is known, for example, to pour large concrete panels which generally have reinforcing steel therein and may have other materials, such as insulation included therein, for use as walls, floors and the like. Many attempts have also been made to form panels from a wide variety of plastic materials. It is known, for example, to employ foamed plastics in combination with structural elements for improved insulating properties.

The production of structures from heat exapndable plastic materials, such as pelletized polystyrene, is known to suffer from the limitations that it is not possible to maintain final overall dimensions equal to mold dimensions. Such materials are normally expanded by heat in a mold to thus fill the mold with a substantially homogeneous material, however, this material is also known to shrink after removal from the mold. The prior art attempts to attain desired final overall dimensions of structures formed in this manner include estimating the degree of shrinkage and expanding the mold by such an amount. Clearly this approach provides only an approximation of the desired final dimensions.

The present invention produces a panel having an expanded plastic core of sheet-like configuration with thin reinforcing strips bonded to front and back surfaces thereof, at least only the edges of the core. This panel has a variety of uses and may be particularly advantageously employed by attaching a wire mesh to one surface in spaced relation thereto for receiving concrete. Panels in accordance with the present invention may be joined together to form a desired shape or structure, and with the above-noted wire mesh on the outer surface thereof, concrete may then be applied to produce a structurally sound building or the like wherein the panels of the present invention form an integral part thereof.

SUMMARY OF INVENTION

The composite panel of the present invention is comprised as an expanded plastic core such as expanded polystyrene. The physical configuration of the core may vary according to the application of the panel and thus, for example, may be planar, curved in one direction, or curved in two opposite directions. The core is expanded in a mold so that it is possible to make substantially and desired panel configuration. The molded sheet of expanded plastic or core of the panel has thin reinforcing strips bonded to opposite major surfaces thereof, i.e., the front and back of the panel have strips thereon. These strips extend along the edges of the surfaces and additional strips may be provided across the surfaces. The reinforcing strips preferably extend from two sides of the front surface of each panel in order to overlap the surfaces of adjacent panels for attachment of panels together. This attachment may be simply accomplished by the use of sheet metal screws or the like extending through the overlapping strips of contiguous panels.

When the panels of the present invention are employed is building structures, it is advantageous to form the panel with a curvature, and preferably a double curvature, so that panels of different shapes may be assembled to form spherical or semispherical surfaces to support a maximum exterior load. For such application the individual panels are provided with a wire mesh on the exterior surface of each and such mesh is mounted upon the panel in spaced relation thereto. Such a panel structure, and particularly a plurality of assembled panel structures, is admirably adapted to receive and retain a layer of concrete applied to the exterior surface thereof. The wire mesh forms reinforcing rod or wire in the concrete. Upon hardening of the concrete there is formed an integral wall structure including the panels of the present invention which may be treated on the interior surface thereof as desired and such a wall structure has extremely good insulating properly substantially in excess of that available from conventional construction.

The method of manufacture of the present invention is rapid, efficient and insures the dimensional stability of the panels. Panel cores are formed by an expanding plastic, such as polystyrene, in a mold through the application of heat. It is known that expanded plastic, such as expanded polystyrene, shrinks upon removal from a mold; however, the present invention overcomes this difficulty.

The method of the present invention provides for the manufacture of panels as described above which have substantially the exact size and configuration required. The core of the panel is formed by heating expandable plastic material, such as pellets of polystyrene, in a separable mold having a cavity with the configuration of the resultant panel. The reinforcing strips are joined to the core in the mold while heat is being applied to bond the strips and core as with an adhesive while the core is fully expanded to fill the mold so that the bonded strips substantially prevent subsequent shrinkage of the core as it cools. The method may be carried out by "mounting" the strips in the mold prior to introduction and expansion of the plastic material or the expanded core may be removed from the mold and the strips placed on the core where they are at least limitedly mounted by the adhesive system employed. The core is then replaced in the mold with the strips thereon and the mold is closed and heated to bond the strips to the core so that the core again expands to mold size. The strips bonded to the full sized hot core restrain the core from shrinking as it cools. The method hereof ensures the production of composite panels having the desired dimensions without the prior art requirement of guessing at the degree of shrinkage.

DESCRIPTION OF FIGURES

The present invention is illustrated as to a particular preferred embodiment and steps of the method of manufacture in the accompanying drawings wherein:

FIG. 1 is a perspective view of a panel formed in accordance with the present invention;

FIG. 2 is a sectional view taken in the plane 2—2 of FIG. 1 and excluding the wire mesh;

FIG. 3 is a sectional view taken in the plane 3—3 of FIG. 1 and including the wire mesh attached to the panel;

FIG. 4 is an enlarged partial view illustrating a means of attachment of wire mesh to the panel in spaced relation thereto;

FIGS. 5, 6 and 7 are perspective illustrations of various panel shapes;

FIGS. 8 and 8A are perspective illustrations of a core mold and mold top, respectively, as may be employed in carrying out the method of the present invention;

FIG. 9 is a perspective illustration of a mold core in accordance with the present invention;

FIG. 10 illustrates a plurality of thin reinforcing strips as employed in the method hereof to form the panel of this invention;

FIG. 11 is a back elevational view of a panel core with reinforcing strips arranged thereon;

FIG. 12 is a plan view of an open mold containing a core having reinforcing strips arranged on front and back surfaces thereof;

FIG. 13 is a plan view of the mold in closed position for bonding the reinforcing strips to the core;

FIG. 14 is a perspective view of a panel formed in accordance with the method of the present invention;

FIG. 15 is a partial sectional view of a panel undergoing degrading of the rear surface thereof;

FIG. 16 is a plan view of one side of a mold that may be employed in the method of manufacture of the composite panels in accordance with the present invention;

FIG. 17 is a central sectional view through a separable mold that may be employed in the method of this invention; and FIG. 18 schematically illustrates at A, B, C and D thereof successive steps in the method of manufacture hereof.

DESCRIPTION OF PREFERRED EMBODIMENT

The structure produced by the present invention and illustrated at FIGS. 1 to 3, for example, is comprised as a core 21 of an expanded plastic material, such as expanded polystyrene. The shape of the core 21 determines the shape of the panel and clearly variations are possible, however, in general, the core has a substantially flat sheet-like configuration with front and back surfaces 22 and 23, respectively. The panel of the present invention may be curved or planar and the embodiment illustrated in FIGS. 1 to 3 is a planar panel. In the following description, the core 21 is considered to be substantially flat to distinguish the shape thereof from cylindrical, spherical, or the like, even though it is realized that the panel may actually be curved, as further described below.

The panel core 21 is formed of a lightweight moldable material having good insulating properties and at least a limited structural rigidity so that the core is, in fact, substantially rigid. The core is preferably formed of an expanded plastic, such as expanded polystyrene, polyethylene or polyurethane of a density to provide good thermal insulation and structural strength. For example, the core may be formed of an expanded polystyrene having a density of the order of one pound per cubic foot to six pounds per cubic foot and a density of two pounds per cubic foot has been found to provide very good thermal and physical properties.

Upon the front surface 22 of the core there is disposed a plurality of thin reinforcing strips 26 including at least horizontal strips 31 and 32 disposed along the top and bottom edges of the front surface and vertical strips 36 and 37 disposed along the side edges of the front surface. Additional strips are preferably provided, as indicated by the centrally located horizontal strip 33 and the centrally located vertical strip 38. Upon the rear surface 23 of the core there are similarly provided thin reinforcing strips 41 including at least horizontal strips 42 and 43 on the top and bottom edges and vertical strips 46 and 47 along the vertical edges. In the illustrated embodiment of the invention there are also provided centrally located horizontal and vertical strips 44 and 46, respectively, upon the back surface of the core, preferably in alignment with similar front strips. These reinforcing strips may be formed of metal, wood or plastic.

The thin reinforcing strips described above are bonded to the core, preferably by the use of an adhesive system, as further described below. It is possible to physically attach the strips to the core by embedding the strips in part in the core or having portions of the core extending over parts of the strips and, of course, a variety of different types of adhesives may also be employed. It is, however, required that the thin reinforcing strips shall be firmly attached or bonded to the core surfaces at least around the edges of the front and rear surfaces. The reinforcing strips may, for example, be formed of a metal such as aluminum, tin-plated steel, or the like and need only have a minimal thickness such as 0.010 inch thick steel. The strips are, however, to have a sufficient width to adhere tightly to the core, although in the illustrations of FIGS. 1 to 3 the width of the strips is exaggerated. In practice a 4 ft.×6 ft. panel may, for example, have 3 inch wide strips. In the following description the strips are considered to be formed of metal.

In order to provide for attachment of panels together to form a wall or the like, the present invention provides for certain of the thin reinforcing strips on the front face of the panel to extend beyond the core. In the embodiment of the invention illustrated in the drawings hereof the vertical strips 36, 37 and 38 are elongated to depend from the bottom edge of the core so as to form metal tabs, as indicated at 51. Additionally the vertical strip 37 on the front face of the panel is extended laterally outward from the right edge of the panel, as best illustrated in FIG. 1. Thus there are provided extensions of the strips along two edges of the front face of the panel for attachment of the panel to other structures, such as another panel. With the strips formed of metal and the side strip 37 overlapping a metal strip on a contiguous panel, sheet metal screws, for example, may be driven through these two strips to join the panel. It will also be noted that, with thin metal strips extending from the panel core as tabs 51, these tabs may be bent as desired. Thus the panel of FIG. 1 may be set upon a concrete slab, for example, with the tabs 51 bent outwardly at right angles to the front surface of the panel and concrete nails driven through these tabs into the concrete to fix the panel thereto.

The panel described above is a lightweight structural member which may be employed in a variety of ways; however, a particularly advantageous method of employing this panel is to attach a wire mesh 61 to the front face in offset or spaced relation thereto, as illustrated in FIGS. 1 and 3 of the drawings. This wire mesh 61 may be attached to the panel by placing small spacer blocks 62 on the metal strips and driving a sheet metal screw 63, for example, through the block into the metal strips with the washer 64 under the head of the screw on top of the wire mesh, as illustrated in FIG. 4. The spacer block 62 may for convenience be formed of the same material as the core.

The purpose of the wire mesh 61 is to provide an apertured surface for holding concrete applied to the front face of the panel and for then comprising reinforcing bar in such concrete. For this purpose the depth of the spacer blocks may be of the order of one inch when a 3 inch concrete coating is to be applied. Generally in practice a plurality of panels in accordance herewith are joined together to form the shape of the desired structure and then the concrete is applied to the outer surface so that, upon hardening, the concrete forms a rigid wall or the like attached to the combination of panels. The panels in this application will be seen to comprise somewhat of a form for a concrete wall which may, for example, be applied by commercially available concrete spraying equipment or by hand; however, the panels of the present invention remain as a portion of the wall and, in fact, provide a high degree of insulation thereto.

As noted above, the panels of the present invention may be formed in a variety of configurations and the planar rectangular configuration of FIG. 1, for example, is shown for ease of description. In FIGS. 5, 6 and 7 there are illustrated possible alternative panel configurations. In FIG. 5 there is illustrated a panel 71 having a generally rectangular outline but having a curved rather than planar configuration. In FIG. 6 there is illustrated a triangular shaped panel 72 also formed as a curved surface. In FIG. 7 there is illustrated a panel 73 having a curvature in two mutually perpendicular directions. It will be seen that the panels of FIGS. 5, 6 and 7 and each formed in accordance with the present invention as described above and panels of these shapes are particularly adapted in multiple combinations to form semispherical surfaces which have maximum strength for exterior loading as by the application of concrete thereto. It is also noted that the panels of FIGS. 5, 6 and 7 are illustrated without the wire mesh thereon; however, it will be appreciated that mesh is attached thereto, as described above, for applications of the panels wherein a coating such as concrete is to be applied to the panels' surfaces.

It would, of course, also be possible to mount a wire mesh on the rear or back surface of the panel; however, such is normally not necessary unless it should be desired to have a double concrete wall. Alternative coatings or the like may be applied to the back surface of the panel if desired and, for this purpose, the back surface of the panel may be treated to improve adherence of such a coating. Thus, for example, if a plaster is to be applied to the back surface of the panels, the core surface may be roughened or degraded as described below and similarly, the thin metal strips may be roughened as by the application of some type of roughening agent such as an adhesive or the like thereto.

The present invention is directed to the method of manufacture of the panel or panels described above. This method is advantageous in providing panels of substantially any desired configuration by molding of the panel core and produces panels having close dimensional tolerances. The method of the present invention is illustrated in FIGS. 8 through 18 with regard to the manufacture of rectangular panels merely for ease of illustration, for the same process is applicable to the formation of alternatively shaped panels, such as those illustrated, for example, in FIGS. 6 and 7.

The core 21 of the present invention is formed in accordance herewith by molding. This molding may be carried out in a mold such as that illustrated at 81 of FIG. 8 having a top 82 for closing the mold. Normally, the mold parts are mounted in equipment which moves them together and apart as required during processing, although such is not shown in the drawings. The interior of the mold 81 is shown to have a rectangular configuration of the dimensions of the resultant panel and a depth of such a panel. With the mold close, i.e. the top 82 applied to the bottom portion of the mold 81, material is inserted in the mold through a pipe or the like 83 extending through a side of the mold. Considering now that the core is to be formed of expanded polystyrene, the mold is filled with small beads of expandable polystyrene through a tube 83 and these beads are chosen to produce the core density desired. The beads may be aspirated into the closed mold as by drawing a vacuum in the mold by a vacuum connection, not shown, until the mold is filled. The polystyrene in the mold is then expanded by the application of heat. Heat may be applied in a variety of ways, however, the convenient and conventional manner is to inject steam into the mold, and for this purpose, a steam line 84 is shown to extend through a mold wall. In practice steam may be injected in a substantial number of places in order to ensure an even dispersion of heat in the material in the mold. With the application of heat, the beads of polystyrene expand to fill the mold and adhere to each other to form the core 21. Molding of polystyrene, for example, is well known in the art and thus only the general steps are described herein.

The reinforcing strips 26 and 41 are bonded to the core 21 within the mold 81 during the application of heat to the interior thereof. Preferably, an adhesive system employed for this purpose is heat responsive so as to complete the bond and at least in one manner of processing in accordance herewith the adhesive system is at least limitedly adhesive before heat setting. Many adhesive systems are known and thus details thereof are not included herein.

In accordance with one manner of processing in accordance with the method hereof, the molded core is removed from the mold and reinforcing strips are placed on the front and back surfaces of the core. These strips are placed at least along the edges of the front and back surfaces and may be temporarily attached to the core in a variety of ways. For example, the core may be molded with small aligning bumps on the front and back surfaces and metal strips, for example, placed with the edges thereof against these bumps are pressed into them to temporarily hold the strips in place. Other alternatives include cleats on the strips to grip the core, openings in the strips to grip bumps or projections on the core or adhesive on the strips. Between the core and strips there is provided a heat activatable adhesive which may be of conventional composition.

Reinforcing strips 41 are placed on the back surface of the core 21 as indicated in FIG. 11, and reinforcing strips 26 are placed on the front surface of the core as indicated in FIG. 12. The front strips 26 are disposed with tabs 51 thereof extending from the bottom edge of the core and with the strips 37 along the right edge of the core overhanging the edge. The core with the strips thereon is replaced in the mold and the mold top is replaced. The side strips 37 and tabs 51 extend over the sides of the mold, as shown in FIGS. 12 and 13. Heat is again applied to the mold, as by injecting steam therein through the pipe 84, to bond the strips to the core by activating the adhesive. It is furthermore noted that when the core 21 is originally removed from the mold and cools, it will shrink. This is an almost unavoidable consequence of casting expanded polystyrene, for example. While it is possible to estimate the amount of shrinkage and make the mold oversized by this amount, it will be appreciated that such an approach is only an approximation. The present invention, on the other hand, provides for re-expansion of the core during the second heating cycle wherein the core and strips are inserted in the mold. As the core is re-expanded to completely fill the mold, adherence of the core to the metal strips along the edges of the core prevents subsequent contraction of the core so that when the core and strips illustrated in FIG. 14 are removed from the mold, the external dimensions of the core are the same as the internal dimensions of the mold. The present invention thus provides for attaining dimensional stability in the casting of the expanded plastic core. A molded expanded polystyrene core, for example, will eventually lose the capability of re-expanding if it is stored for an extended period of time before reinsertion in the mold for bonding of the metal strips thereto. Thus it is necessary for the process of the present invention to be carried out in an orderly manner whereby the capability of the core to re-expand is employed.

The above-described process of forming the core with reinforcing strips bonded thereto may be modified in various ways. Thus, for example, it is possible to position the reinforcing strips in a mold, inject an expandable plastic and add heat to form the panel. Bonding to the core and strips may also be accomplished mechanically as well as chemically as by forming the strips in such a manner that they are mechanically gripped by the expanded plastic.

The method of the present invention may, for example, be carried out by simultaneously forming the core and bonding the reinforcing strips thereto. Reference is made to FIGS. 16-18 wherein there are shown a mold adapted to this manner of carrying out the present invention and a schematic representation of successive steps in this variation of the method.

A mold 101 is formed of separable mating bottom 102 and top 103 pieces which define a mold cavity 104 having the size and shape of a panel to be manufactured. A steam chest 106 communicates with the mold cavity by a plurality of openings in the mold bottom 102 and a steam line 107 extends from the steam chest to a source of steam for applying heat to the interior of the mold. Other heating means may be employed. The mold may be formed of aluminum or other non-ferrous material and a plurality of small magnets 108 are embedded in the mold bottom 102 in lines along which reinforcing strips are to be disposed. Thin steel reinforcing strips are then placed in the mold along predetermined lines, as described above, and are held in such position by the magnets. It will thus be seen that magnets are positioned in line along each edge of the mold bottom, for example. In order to precisely align the strips in the mold, there may also be provided small bumps or projections 109 on the inside of the mold bottom, so that strips may be disposed in abutting relation to a line of projections as a proper strip location for the front of a panel.

The mold cover or top 103 is also provided with magnets 108 embedded therein, and small projections 109 thereon in the same manner as the mold bottom for aligning and mounting reinforcing strips in the required positions for the back of a panel.

With the ferrous reinforcing strips mounted on the mold parts, the mold is closed and held in this position. The heat expandable plastic material is then introduced into the mold as in the form of beads or pellets of polystyrene, for example. The material may be blown by air pressure into the mold through a feed line 111 communicating with the mold cavity 104. Control of air pressure provides a control of the amount of material forced into the mold cavity.

The interior of the mold is next heated as by the application of steam thereto. The strips disposed in the mold are preferably coated with an adhesive on the exposed surfaces thereof and the application of heat not only expands the plastic material into a substantially homogeneous solid core, but also fuses or adheres the strips to the core. Of course, the strips may include partially cut out tabs or the like which are bent to extend inwardly of the mold cavity so that the core formation locks these tabs within the core to anchor the strips to the core.

In the present method, as described above, the strips are bonded to the core during the application of heat to the core material in the mold. Under the circumstances, the core entirely fills the mold cavity and tendency of the core of the core to shrink after removal from the mold and during cooling is restrained by the metal strips bonded to the core. Thus a panel formed in accordance herewith has close tolerances, i.e. a substantially exact reproducible size and configuration which is highly advantageous. Opening of the mold and removal of the composite core thus completes the process of manufacture of a highly advantageous product in a simple and efficient manner. The construction and operation of molds are well known in the art and thus details of molding technology are not included herein. It is, however, further noted that reinforcing strips which are to extend from the core edges are, in fact, extended out of the mold, i.e. over the edges of the mold between the mold bottom and tip, so that the desired panel structure is achieved.

The application of wire mesh to the front surface of the panel has been described above and may be readily accomplished by attachment thereto with sheet metal screws, for example. It was also noted above that under some circumstances, a coating of a material, such as plaster, may be applied to the back surface of panels of the present invention. Under these circumstances, it is advantageous to provide such surface with advantageous characteristics for receiving and retaining such a coating. The exterior surface of the core 21 are relatively smooth and the adherence of plaster or the like thereto may be greatly improved by "degrading" the rear surface of the core. This may be advantageously accomplished by lightly spraying a solvent on the back surface of the core, as generally illustrated in FIG. 15. As small droplets of a suitable solvent are applied as by a spray 91 to the vertical core 23, these droplets will dissolve core material. It will be recalled that the core has been formed by expanding tiny beads of polystyrene, for example, and thus the core density actually decreases from each original bead center to the contact with the next bead and then increases back to the adjacent bead center. The solvent consequently acts primarily between original bead centers to dissolve material and it has been found that spraying of a solvent on a vertical surface of the core produces very irregularly constituted small openings in the core which tend to extend downwardly and inwardly of the core from the surface. These indentations or small cavities are admirably suited to receive a coating, such as plaster which then flows into the cavities and securely locks the coating onto the core. It is noted that the illustration of FIG. 15 does not attempt to show the strips on the core, however, the degrading of the core surface is accomplished after the strips are applied. Inasmuch as the reinforcing strips may be quite smooth, it is also preferably to apply some type of roughening agent to the strips prior to the application of a coating, such as plaster. Various types of material are suitable for thus, such as, for example, some type of an ashesive material which sticks tightly to the outer surface of these strips, but is not smooth. It is also noted that the provision of small cavities in the rear panel surface may be achieved during molding by limiting expansion and joinder of the beads of plastic material so that they do not form a smooth surface and a roughened surface results.

There has been described above a method of manufacturing an improved composite panel structure that is lightweight, inexpensive and has extremely good insulating properties. The panel structure is primarily intended for utilization with exterior coatings; however, such is not absolutely necessary. The application of wire mesh to the front surface of a panel in accordance with this invention provides an improved panel particularly adapted to receive concrete coating.

The present invention as to panel structure and method of manufacture has been set forth above with respect to particular preferred embodiments of the panel and steps of manufacture; however, it will be appreciated by those skilled in the art that modifications and variations thereof are possible within the scope of the present invention. It is not intended to limit the present invention to the precise terms of description nor details of illustration.

What is claimed is:

1. A method of manufacturing a composite panel comprising the steps of
    heating a heat expandable plastic material in particular form in a separable closed mold to expand the material into a panel core having the shape of the mold cavity, and
    adhering thin reinforcing strips in spaced apart relation to the front and back surfaces of the expanded core while the core is heated with the ends of predetermined strips extending from edges of the core.

2. The method of claim 1 further defined by
    inserting said strips into said mold prior to introduction of said expandable plastic material into said mold whereby
    said core with said strips thereon is formed by said application of heat.

3. The method of claim 2 further defined by
    forming said strips of a ferrous material,
    positioning said strips within said mold by small protuberances on inner surfaces of said mold within which said strips are placed, and
    maintaining the position of said strips in said mold by magnetic forces.

4. The method of claim 2 further defined by
    forming at least one of said strips with one or more portions thereof indented toward the interior of said mold for surrounding by heat expanded plastic material to mechanically lock the strip to said core.

5. The method of claim 1 further defined by adhering said strips to said core by
    attaching said strips to said core after core formation with a heat activated adhesive between strips and core, and
    returning said core to said mold and reheating the core with the strips thereon to permanently adhere the strips to the core while expanding said core to the full size of the mold whereby said adhered strips prevent core shrinkage.

6. A method of forming a composite panel comprising
    forming a separable non-ferrous mold with magnets buried in the mold parts along predetermined lines,
    placing thin ferrous reinforcing strips with a heat-activated adhesive on inner surfaces thereof on the mold pieces along predetermined lines to mount the strips thereat,
    closing the mold with said strips mounted thereon and filling the mold with a heat expandable plastic material in particulate form,
    heating the material in the mold to expand the material into a molded panel core having the size and shape of the mold interior, and at the same time, adhering said strips to said core, and
    removing said panel core and attached strips as a composite panel.

7. A method of manufacturing a panel comprising
    (a) filling a closed mold with a heat expandable plastic material in divided form.
    (b) heating the material in said mold to expand the material into a cellular core for a panel,
    (c) removing the core from the mold whereby said core shrinks,
    (d) placing a first plurality of thin, flat, reinforcing strips on the back surface of the core at least along the edges thereof with a heat activated adhesive on the surfaces of the strips contacting the core,
    (e) placing a second plurality of thin, flat, reinforcing strips on the front surface of the core at least along the cores edges with a heat activated adhesive on the surfaces of the strips contacting the core,
    (f) replacing the core in the mold with said plurality of strips thereon,
    (g) closing mold and heating the interior thereof to re-expand the core to the mold dimensions and to bond the strips to the expanded core, and
    (h) removing the core and bonded strips from the mold as a panel having the dimensions of the mold and which does not shrink upon cooling.

8. The method of claim 7 further defined by placing said second plurality of strips on said core with portions extending from two adjacent core edges over the mold edges and closing said mold with said portions extending therefrom.

9. The method of claim 8 further defined by applying droplets of a plastic solvent to one surface of the core of said panel to form small cavities therein.

* * * * *